April 22, 1969  C. H. GIBBS  3,440,349
NOISE LEVEL VISUAL INDICATOR
Filed July 5, 1966  Sheet _1_ of 2

INVENTOR.
CHARLES H. GIBBS
BY John B. Dickman III
AGENT.

United States Patent Office 3,440,349
Patented Apr. 22, 1969

3,440,349
NOISE LEVEL VISUAL INDICATOR
Charles H. Gibbs, 1847 Idlewood St.,
East Cleveland, Ohio 44112
Filed July 5, 1966, Ser. No. 562,754
Int. Cl. H04m 1/00; A63h 33/26
U.S. Cl. 179—1                                     12 Claims

ABSTRACT OF THE DISCLOSURE

An animated face structure which changes facial expressions in response to noise levels in a surrounding environment and includes adjacent light illuminating layers having different light reflecting mood expression grooves that are selectively illuminated by light sources which are selectively actuated by a sound pickup responsive means.

---

This invention relates generally to animated faces for clowns and the like and more particularly to an animated face structure which changes facial expression in response to a predetermined noise level in the immediate surroundings.

The present invention can be employed as a toy, but has greater utility in its use as a noise level indicator, particularly in those situations where a group of children may be involved. One of the most difficult discipline problems is that of maintaining a reasonable noise level among a group of children. Disciplining of children to maintain a relatively low noise level is difficult, since the individual child is usually not aware of the level of his noise with respect to the level of the noise of the other children around him. This problem with children is especially evident in classrooms.

Although, through experience, adults have a greater comprehension of the noise level of their own conversation, situations arise when one's conversation may be excessively loud for the immediate surroundings. These situations arise in such places as hospitals and libraries. Whenever an individual is informed that his conversation is excessively loud, that individual may be offended. Therefore, a need exists for a device which will accurately determine the noise level in the immediate surroundings and provide some indication of that noise level being too excessive for those surroundings. Therefore, such a device which would not rely upon human judgment as to the noise level, would not tend to offend the individual whose conversation is relatively loud.

It has been proven that children are greatly influenced by expressions of human emotion. For instance, many instructors and teachers in the elementary grades employ a symbol of a human face with either a "happy" or "sad" expression thereon for grading the work of the children. This type of symbolism has been proven to be more effective than that of employing a letter grade, since the children are more deeply impressed with the human emotion which is symbolized. Thus, if a child has performed his work properly and he receives a "happy face" on his paper, he becomes impressed with the fact that his teacher is satisfied or "happy" with his work. If a similar type of symbolism can be employed for informing children of the relative noise level which they create, the discipline of the children in maintaining their conversation relatively low will be much less difficult. However, since noise level is difficult to determine by the human, some method must be employed which is a fair judge of the relative noise level among a group. Therefore, a great need exists for a device for judging the noise level among a group of individuals which will display symbolically some type of human emotion in response to the relative noise level in the immediate surroundings.

Such a device may also have a special application in a deaf school to visually and automatically make the deaf children aware that a certain "throat exercise" is undesirable. Such a device may also be attractive as a night light and be employed as a quieter for young children in the home.

Therefore, it is an object of the present invention to provide an animated face structure which changes facial expressions in response to a predetermined noise level in the immediate surroundings.

It is another object of the present invention to provide a device for sensing the noise level in the immediate surroundings and displaying a visual indication of that noise level.

Still another object of the present invention is to provide an animated face structure which will display a "smiling expression" when the noise level in the immediate surroundings is relatively low and a "frown expression" when the noise level is relatively high.

Another object of the present invention is to provide an animated face structure which will change colors in response to the noise level in the immediate surroundings.

Accordingly, a feature of the present invention resides in the provision of an animated face structure which generally includes a pair of light conducting layers each having at least one light reflecting groove in a surface thereof representing a facial feature, a pair of light sources in light communication with a respective one of the layers, and means for selectively actuating each of the light sources.

A further feature of the present invention resides in the provision of a different color emission for each of the light sources. A semispherical light conducting member may be secured to a surface of one of the layers and positioned over the light sources to represent a certain feature of the face structure, such as a nose.

Another feature of the present invention resides in the provision of a device which is responsive to a noise level above a predetermined level for actuating one of the light sources and to a noise level below the predetermined level for actuating the other of the light sources.

These and other objects, features and advantages of the present invention will be more fully realized and understood from the following detailed description when taken in conjunction with the accompanying drawings wherein.

Like reference numerals throughout the various views of the drawings are intended to designate the same or similar structures.

Figure 1:
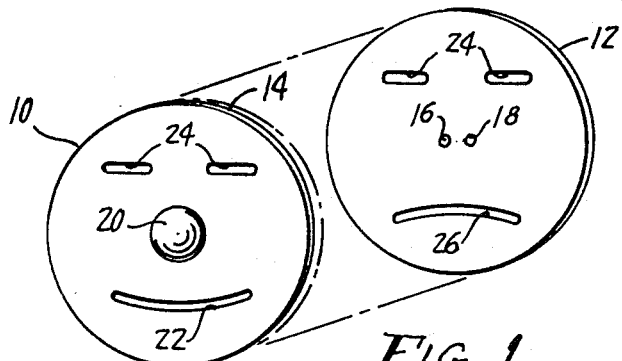
FIGURE 1 is a perspective view of the animated face structure which is slightly separated for better illustration thereof.

With particular reference to FIGURE 1, there is illustrated a pair of light conducting layers 10 and 12 which may be formed of Lucite or the like material. The dashed line 14 in FIGURE 1 illustrates the relative position of the layer 12 with respect to the layer 10 when the face structure is in its assembled form. A pair of apertures 16 and 18 are provided in the layer 12 and are disposed for receiving a pair of light sources therein for illuminating the layers 10 and 12. A semishperical member 20 is positioned on one surface of the layer 10 and at a point thereon which will cover the apertures 16 and 18 in the layer 12. The member 20 may be constructed of one-half of a ping-pong ball which is bonded to the surface of the layer 10.

An arcuate groove 22 is disposed in a surface of the layer 10, which represents a smile type of expression thereon, and which reflects light outwardly of the layer 10 and transverse to the plane thereof when light is conducted longitudinally through the layer 10. Similar grooves 24 are provided in both of the layers 10 and 12 representing the eyes of the face structure and another arcuate groove 26 representing a frown expression is provided on the surface of the layer 12 directly behind the groove 22 in the layer 10. Each of these grooves will reflect light from the plane of the layers 10 and 12 outwardly therefrom and transverse to the plane of the layers to illuminate the respective areas thereof.

Figure 2:
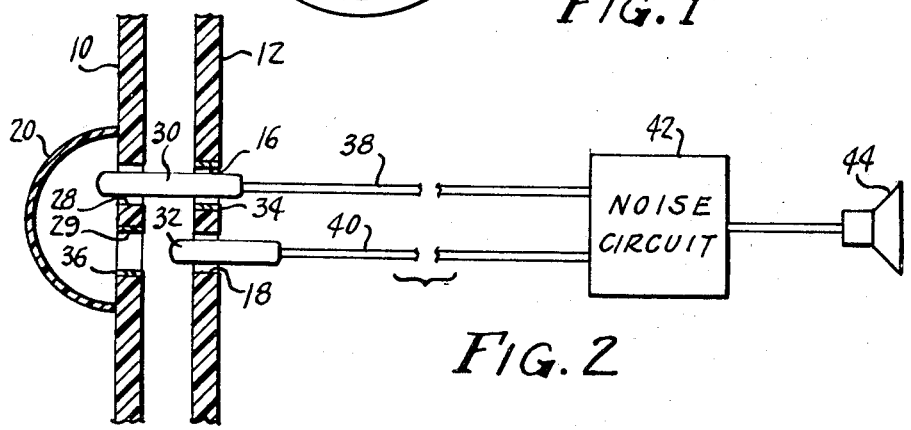
FIGURE 2 is a sectional view across a horizontal diameter of the face structure illustrated in FIGURE 1 with the light sources and light actuating means illustrated in conjunction therewith.

The manner of illuminating the layers 10 and 12 is illustrated in FIGURE 2. As shown therein, a pair of apertures 28 and 29 are provided in the layer 10 in alignment with the apertures 16 and 18 in the layer 12. A light source 30 extends through the apertures 16 and 28 and preferably emits a red light. A second light source 32 extends only through the aperture 18 and preferably emits a blue light. A material 34 is provided around the circumference of the aperture 16 which blocks the red light from the light source 30 from entering the layer 12 and a similar material 36 is provided around the circumference of the aperture 29 for blocking the blue light from the light source 32 from entering the layer 10. The materials 34 and 36 may constitute respective light filters for the respective color emissions or may be entirely opaque to block all light impinging thereon. The aperture 29 allows illumination of the semispherical member 20 by the light source 32. Each of the light sources 30 and 32 are connected by means of leads 38 and 40 respectively to a noise circuit 42 which is responsive to a noise level signal generated by a microphone 44. Preferably, when the noise level is below a predetermined level, the light source 30 will be actuated to illuminate the semispherical member 20 and the grooves 22 and 24 in the layer 10. When the noise level exceeds the predetermined level, the light source 30 will be cut off and the light source 32 will be actuated to again illuminate the semipherical member 20 and the grooves 24 and 26 in the layer 12.

Figure 3:
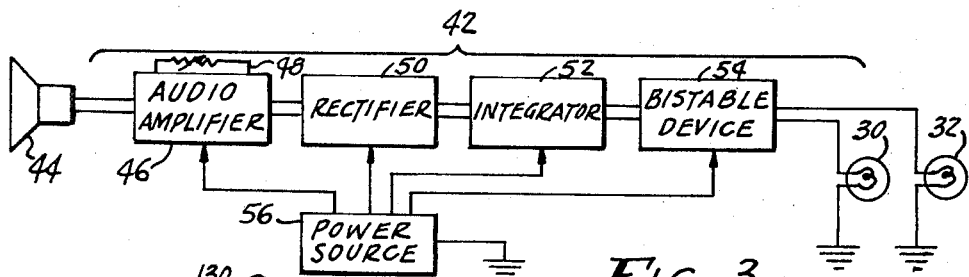
FIGURE 3 is a block diagram of the light source actuating means employed in the present invention.

The noise circuit 42 is better illustrated in FIGURE 3 in block form in conjunction with the microphone 44 and the light sources 30 and 32. As shown therein, the microphone 44 is connected to an audio amplifier 46 having a sensitivity control 48 in the form of a variable resistor connected thereto. The microphone 44 converts the sound in the immediate surroundings into an electrical voltage which is amplified by the audio amplifier 46. This amplifier 46 may consist of a two-stage transistor amplifier with DC coupling. An output of the audio amplifier 46 is connected to a rectifier 50 wherein the amplified AC fluctuations from the final stage of the amplifier 46 are converted into a DC voltage. An integrator circuit 52 is connected to an output of the rectifier 50 which performs essentially to add the DC voltages from the rectifier 50 to provide a signal which corresponds to the sound intensity at the microphone 44. A bistable device 54 is connected to an output of the integrator 52 and when the summed voltages in the integrator 52 reach a predetermined level, the bistable device 54 changes states. The lights 30 and 32 are connected to an output of the bistable device 54 and a change in the state thereof causes the respective lights to change from an "on" to an "off" condition thereby changing the expression simulated on the layers 10 and 12.

The integrator 52 preferably includes a drain resistor which continually removes a small amount of signal from the sound signal so that a very small noise signal summed over a relatively long period of time will not change the state of the bistable device 54. In actuality, the integrator 52 performs as a filter so that short bursts of signal above the predetermined level do not change the state of the bistable device 54. Therefore, a sustained noise or a large amount of disturbance must occur before the bistable device changes states. In order to perform these functions, integrator circuit may simply consist of a simple RC network. The bistable device 54 may be formed of one or a pair of thyristors, such as SCR semiconductors. The bistable device 54 may also consist of appropriate circuitry in combination with a relay or a Schmitt trigger circuit. A power supply 56 is connected to each of the circuits 56, 50, 52 and 54 for supplying a suitable source of potential thereto. The power supply 56 and the light sources 30 and 32 are connected to a reference potential, such as ground, for completing the electrical circuit therebetween.

Figure 4:
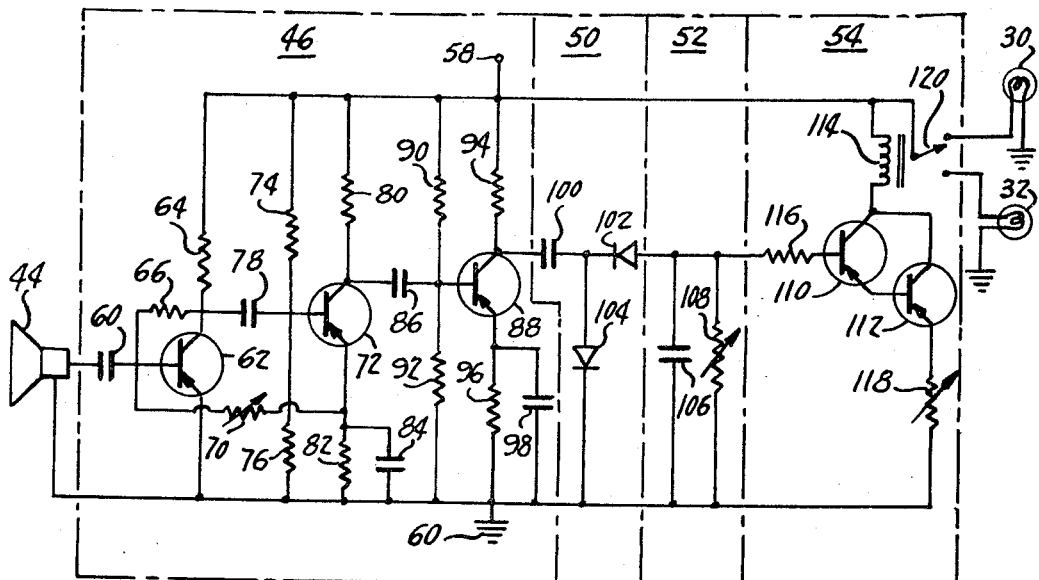
FIGURE 4 is a schematic diagram of one embodiment of the noise circuit illustrated in FIGURES 2 and 3.

One embodiment of the noise circuit 42 is illustrated in FIGURE 4 wherein a source of potential from the power supply 56 is connected to a terminal 58 which supplies an operating voltage to each of the stages. The microphone 44 is connected through a capacitor 60 to a base electrode of a transistor 62 which forms an input of the audio amplifier 46. A resistor 64 is connected between the terminal 58 and a collector electrode of the transistor 62 and a resistor 66 connects the collector and the base of the transistor 62. An emitter electrode of the transistor 62 is connected to a reference potential, such as ground, generally designated with the reference numeral 68. A variable resistor 70 which forms a sensitivity control is connected between the base of the transistor 62 and an emitter electrode of a transistor 72.

The operating point of the transistor 72 is established by a voltage divider circuit including a pair of resistors 74 and 76 connected in series between the terminal 58 and the reference point 68. A base electrode of the transistor 72 is connected to a common connection between the resistors 74 and 76 and is further connected through a capacitor 78 to the collector of the transistor 62. A collector electrode of the transistor 72 is connected through a resistor 80 to the terminal 58 and the emitter electrode thereof is connected through a resistor 82 and capacitor 84 in parallel to one another to the reference point 68. A capacitor 86 couples an output of the transistor 72 to a base electrode of a transistor 88 which forms the final amplification stage of the amplifier 46.

The operating point of the transistor 88 is established by a voltage divider network including a pair of resistors 90 and 92 connected in series between the terminal 58 and the reference point 68 with a connecting point thereof connected to the base of the transistor 88. The collector of the transistor 88 is connected to the terminal 58 through a resistor 94 and the emitter thereof is connected through a resistor 96 and a capacitor 98 in parallel with one another to the reference point 68.

An output of the audio amplifier 46 from the collector of the transistor 88 is connected through a coupling capacitor 100 to the rectifier 50 which generally includes a pair of diode rectifiers 102 and 104. The rectifier 50 is connected to the integrator 52 which includes a capacitor 106 and a variable resistor 108 in parallel with one another. Signal fluctuations at the collector of the transistor 88 will cause conduction of the rectifier 102 to charge the capacitor 106 to a level which is substantially equal to the noise level detected by the microphone 44. The resistor 108 allows the capacitor 106 to discharge at a relatively low rate during operation of the circuit.

The bistable device 54 generally includes a pair of transistors 110 and 112 and a relay 114. An output of the integrator 52 is connected through a resistor 116 to the base of the transistor 110. The emitter of the transistor 110 is connected to the base of the transistor 112 and the collectors of the transistors 110 and 112 are connected to one another. The emitter of the transistor 112 is connected through a variable resistor 118 to the reference potential point 68 and the collector electrodes of the transistors 110 and 112 are connected through the relay 114 to the source of potential on the terminal 58.

The relay 114 is illustrated in FIGURE 4 in the normally closed position thereof with a contact arm 120 thereof connecting the light source 30 between the source of potential at the terminal 58 and the reference potential. When the noise level exceeds a predetermined limit, the audio amplifier 46 amplifies the signal developed by the microphone 44 and charges the capacitor 106 to a certain level to cause conduction of the transistors 110 and 112 and actuation of the relay 114. When the relay 114 is actuated, the contacting arm 120 is moved to connect the source of potential on the terminal 58 with the light source 32.

Figure 5:
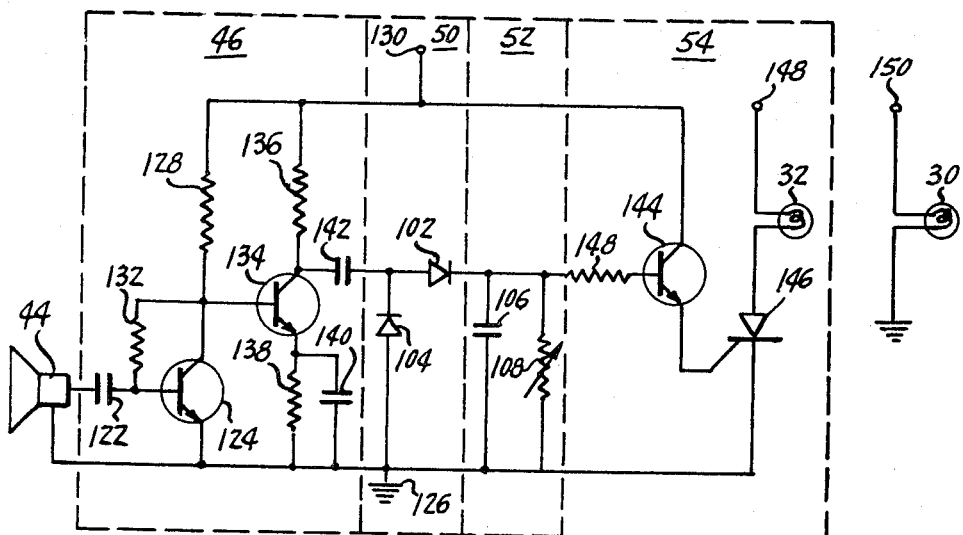
FIGURE 5 is a schematic diagram of another embodiment of the noise circuit.

Another embodiment of the noise circuit is illustrated in FIGURE 5. As is shown therein, the microphone 44 is connected to an input of the audio amplifier 46 through a capacitor 122 to the base electrode of the transistor 124. The emitter of the transistor 124 is connected to a reference potential point 126 and the collector thereof is connected through a resistor 128 to a source of potential on the terminal 130. The collector of the transistor 124 is connected to the base thereof through a resistor 132. An output of the transistor 124 at the collector electrode thereof is DC coupled to the base of a transistor 134 forming the output stage of the amplifier 46. The collector of the transistor 134 is connected through a resistor 136 to the terminal 130 and the emitter is connected through a resistor 138 and a capacitor 140 in parallel with one another to the reference point 126. An output of the transistor 134 at the collector thereof is connected through a capacitor 142 to the rectifier circuit 50. The rectifier 50 and integrator 52 illustrated in FIGURE 5 are similar to the same circuits illustrated in FIGURE 4 with the exception that the diodes 102 and 104 are oppositely poled, due to the different polarity of potential applied to the terminals 58 and 130 respectively.

The bistable device 54 includes a transistor 144 and a thyristor or silicon controlled rectifier 146. An output of the integrator 52 is connected through a resistor 148 to the base of the transistor 144 for supplying a biasing signal thereto. An emitter of the transistor 144 is connected to a gate electrode of the thyristor 146 and a collector thereof is connected to the terminal 130. The thyristor 146 is connected in series with the light source 32 between the source of alternating current on a terminal 148 and the reference point 126. Therefore, when the transistor 144 is caused to conduct, the thyristor 146 will also conduct causing the light source 32 to be illuminated. In the embodiment illustrated in FIGURE 5, the light source 30 is connected between a source of alternating current potential on a terminal 150 and the reference potential. Therefore, the light source 30 will be maintained "on" at all times while the light source 32 will be activated only during those times when the noise level exceeds a predetermined limit.

By the use of an additional thyristor or silicon controlled rectifier in circuit with the light source 30, control of the light source 30 can be provided which is similar to the control provided in the embodiment illustrated in FIGURE 4. Circuits for performing in such a manner are well known in the art.

Figure 6:
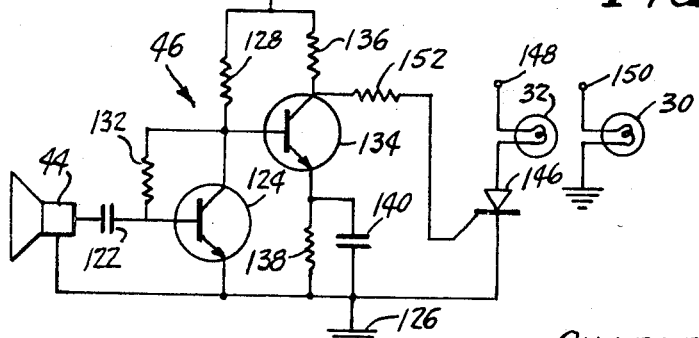
FIGURE 6 is a schematic diagram of still another embodiment of the noise circuit.

Still another embodiment of the noise circuit 42 is illustrated in FIGURE 6, which is much simpler than the circuits illustrated in FIGURES 4 and 5. As illustrated therein, the amplifier 46 is identical to that illustrated in FIGURE 5. However, the rectifier 50 and integrator 52 as well as the transistor 144 are eliminated from the circuit and the collector of the transistor 134 is connected directly to the gate electrode of the thyristor 146 through a resistor 152. The circuit of FIGURE 6 does not require rectification and filtering of the signal representative of the noise level, since any signal variation above the predetermined level will actuate the thyristor 146 to cause conduction thereof through an entire half cycle of the alternating current voltage applied to the terminal 148. Once the thyristor 146 is triggered to an "on" condition, it will remain conductitve during the entire positive half cycle of the alternating current potential applied thereto.

The principles of the invention explained in connection with the specific exemplifications thereon will suggest many other applications and modifications of the same. It is accordingly desired that, in construing the breadth of the appended claims they shall not be limited to the specific details shown and described in connection with the exemplifications thereof.

The invention claimed is:

1. A noise level visual indicator device comprising a pair of companion adjacent light conducting layers constituting frontal representations of faces, each layer having a first light reflecting groove in a surface thereof with the groove in each layer defining a facial expression feature and the groove in each layer imparting to its associated layer a different emotional appearance, a light source in light-communication with each layer and means for selectively activating each light source in response to noise levels above and below a predetermined decibel value whereby the noise level in the surrounding environment in which the device is disposed controls the selective illumination of the layers and the grooves therein.

2. The device as defined in claim 1 wherein each of said layers includes an aperture therein each receiving a respective one of said light sources, each of said light sources having a different color emission.

3. The device as defined in claim 2 wherein said layers are positioned adjacent one another with said light sources in adjacent position to one another, and including a semispherical light conducting member secured to a surface of one of said layers and positioned over said light sources.

4. The device as defined in claim 1 wherein said activating means includes means responsive to a noise level below a predetermined decibel value for actuating one of said light source and then to a noise level above the predetermined value for deactivating said one light source and for actuating the other of said light sources with said means reversing the illumination action when the noise level falls below the predetermined decibel value.

5. The device as defined in claim 1 wherein said actuating means includes a sound pickup, and means responsive to an output of said sound pickup for actuating one of said light sources.

6. The device as defined in claim 1 wherein said actuating means consists of a sound pickup, an amplifier connected to said sound pickup, a source of potential, a reference potential, a first thyristor connected in series circuit with one of said light sources, the series circuit of said first thyristor and said one light source connected between said source of potential and said reference potential, said first thyristor including a conduction control electrode connected to an output of said amplifier.

7. The device as defined in claim 6 wherein the other light source is connected between said source of potential and said reference potential.

8. The device as defined in claim 6 including a second thyristor connected in series circuit with the other of said light sources, the series circuit of said second thyristor and said other light source connected between said source of potential and said reference potential, said second thyristor including a conduction control electrode connected to the output of said amplifier.

9. The device as defined in claim 1 wherein each of said layers is formed of a sheet of Lucite, said first groove representing a certain facial feature, a plurality of second light reflecting grooves representing other facial features, each of said light sources positioned with respect to a respective one of said layers to transmit light longitudinally therethrough and said grooves being shaped to reflect and transmit light transversely of said layers.

10. The device as defined in claim 1 wherein said actuating means includes a microphone responsive to external sound, an amplifier connected to said microphone, a rectifier connected to an output of said amplifier, an integrator connected to an output of said rectifier, and bistable means connected between an output of said integrator and said light sources for actuating one of said light sources in response to an output level of said integrator above a certain value and the other of said light sources in response to an output level of said integrator below said certain level.

11. The device as defined in claim 9 wherein said bistable means includes a first thyristor having a control electrode connected to an output of said integrator and one of the cathode and anode thereof connected to said one light source.

12. The device as defined in claim 10 wherein said bistable means includes a second thyristor responsive to the output of said integrator and connected to said other light source.

References Cited

UNITED STATES PATENTS 2,766,552 10/1956 Odenkirchen _____ 46—226
3,163,077 12/1964 Shank.

LOUIS G. MANCENE, *Primary Examiner.*

ROBERT F. CUTTING, *Assistant Examiner.*

U.S. Cl. X.R.

46—226